March 11, 1930.  E. A. STANGER  1,750,495
ELECTRIC HEATING DEVICE
Filed Nov. 18, 1927  2 Sheets-Sheet 1
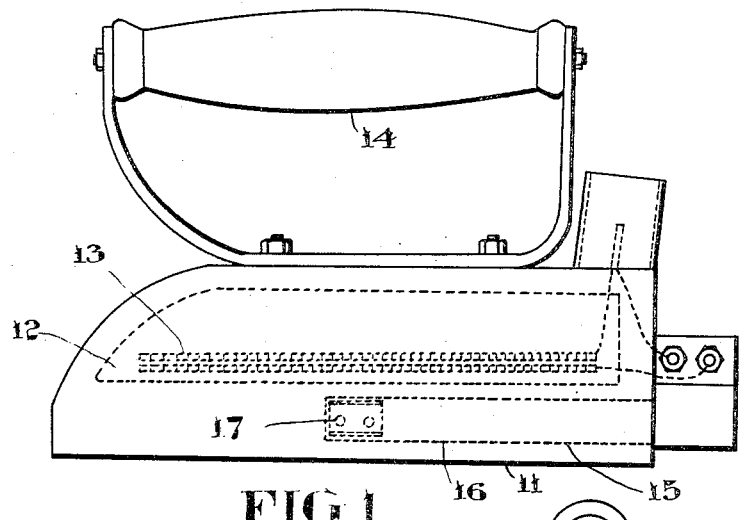
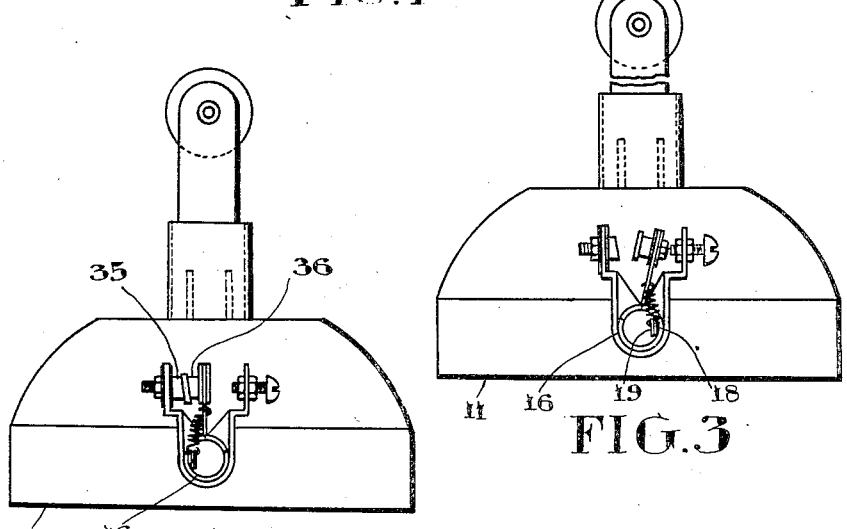
INVENTOR
EDWARD. A. STANGER
BY Fetherstonhaugh & Co
ATTORNEYS March 11, 1930.  E. A. STANGER  1,750,495
ELECTRIC HEATING DEVICE
Filed Nov. 18, 1927   2 Sheets-Sheet 2
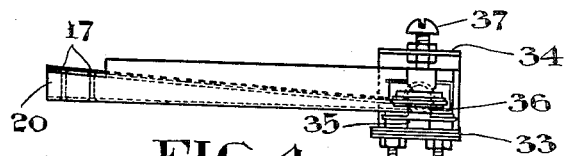
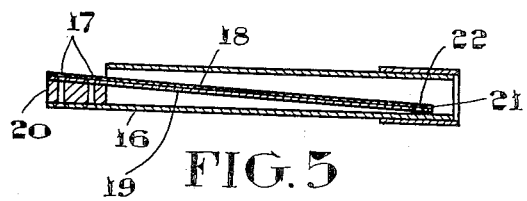
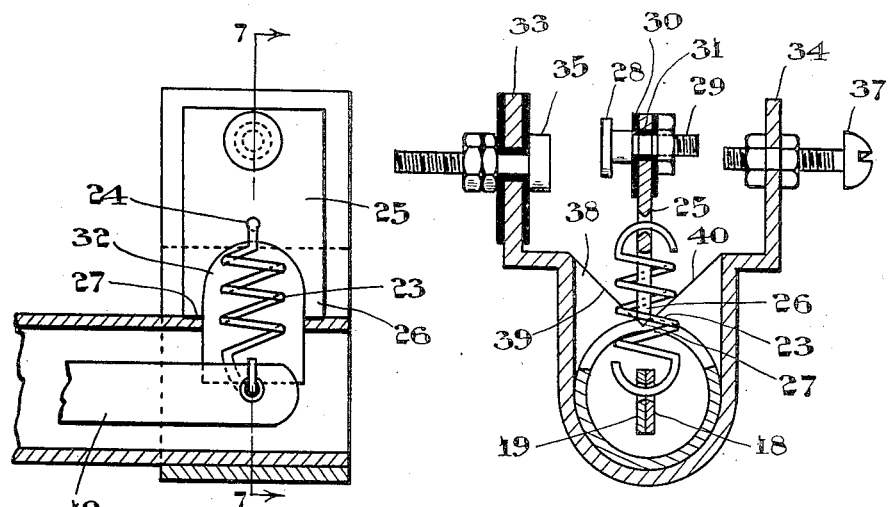
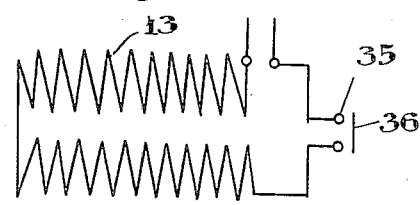
INVENTOR
EDWARD.A.STANGER
BY Fetherstonhaugh & Co
ATTORNEYS Patented Mar. 11, 1930

1,750,495

UNITED STATES PATENT OFFICE

EDWARD ARTHUR STANGER, OF MONTREAL, QUEBEC, CANADA, ASSIGNOR OF ONE-HALF TO AARON SCHWARTZ, OF MONTREAL, QUEBEC, CANADA

ELECTRIC HEATING DEVICE

Application filed November 18, 1927. Serial No. 234,253.

This invention relates to new and useful improvements in electric heaters and particularly to the thermostatic control of devices where electrical means are employed.

The object of the invention is to provide means which will automatically control the current supply to a heater or other devices, to maintain the said devices at a practically safe and uniform temperature, so that if the heater should be left connected, it will not reach a temperature sufficient to damage any object or material in contact therewith.

Another object is to provide a simple and durable heat controlling device which may be economically manufactured and which may be readily installed in an electric heater.

A further object is to provide heat controlling means which may be quickly and easily adjusted to operate within predetermined temperatures and which when once adjusted, will need no further attention during the life of the device.

A still further object is to provide heat controlling mechanism which will make and break the electrical circuit across two contact points without arcing or burning same.

According to my invention I provide a bi-metallic element which is connected to a quick make and break switch, so that the difference in the expansion of the metals causes a movement of the bi-metallic element. This movement operates the switch to control the current supply to an electrically operated heating unit and keeps same within predetermined temperature limits.

In the drawings which illustrate my improved heat controlling device as applied to electric irons:—

Figure 1 is a side elevation of my improved heat controlling element mounted in the sole of an electric iron.

Figure 2 is an end view of the iron with the contacts of the elements in the closed circuit position.

Figure 3 is a view similar to that shown in Figure 2 with the contacts aforementioned in the open position.

Figure 4 is a plan view of the heat controlled unit which operates the switch.

Figure 5 is a section plan of the device shown in Figure 4.

Figure 6 is an enlarged part sectional end view of the switch operating mechanism.

Figure 7 is a sectional end view taken on the line 7—7 Figure 6.

Figure 8 is a wiring diagram illustrating the connections.

Referring more particularly to the drawings in which, for illustrative purposes only, I have shown my improved heat controlling device mounted on an electric iron, 11 designates the sole of the iron above which is formed a chamber 12 for the heating element 13 shown diagrammatically. The heating element is connected to a plug not shown, which in turn may be connected to a source of current supply. The iron may be supplied with the usual handle 14. A recess 15 is formed in the base or sole to receive and position the heat controlling element hereinafter described.

The heat controlling element consists of a hollow sheath or tube 16 and secured to said sheath at one end thereof, by means of the rivets 17, are the metallic strips 18 and 19. The strips are made of metals having different co-efficients of expansion and are connected together so that they form a bi-metallic strip which will arc or bend between its ends when subjected to change in temperature. The bi-metallic strip extends substantially the full length of the tube and a suitable distance piece 20 may be placed between the sides of the tube and the adjacent strip to hold the fixed ends of the strips in position. The free end 21 of the bi-metallic strip is provided with an aperture 22 which is preferably countersunk on both sides to provide a knife edged bearing for the end of a tension spring 23, the other end of which is passed through an aperture 24 similar to the aperture 22, but formed in a U-shaped member 25. The ends of the legs 26 of the U-shaped member rest in grooves 27 formed in the outer wall of the tubular member, and on each side of a slot 32 formed therein. A contact bridging bar 28 is secured to the upper end of the member 25 by means of the bolts 29 and suitable insulating washers 30 and bushings 31 are placed between the bolts and the member 25 to prevent the current from passing thereinto. The slot 32 is formed in the tube to allow free movement of the spring. Secured to and extending upwardly from the tube are the arms 33 and 34, one of which supports the contacts 35 and 36 which are insulated from the arm and connected to the heating element 13, so that when the contacts are bridged by the bar 28, the circuit to the said heating element is closed. The arm 34 carries a screw 37 which may be adjusted to regulate the pivoting movement of the member 25.

The operation of the device is as follows:—
The contacts 35 and 36 are normally in the closed position bridged by the bar 28, as shown in Figure 2, and the iron is connected to a source of current supply to heat the element 13 which heats the sole of the iron. When the temperature rises to a predetermined value, the bi-metallic bar bends due to unequal expansion of the metals forming same and moves towards the side of the tube. This movement causes the spring to pull on the member 25 to pivot same in the grooves in the tube, to pull or move the bridging member clear of the contacts thus breaking the circuit to the heating element, as shown in Figure 3. On cooling, the bi-metallic bar contracts unevenly and tends to straighten out, thereby causing the spring to pivot the member 25 to close the circuit to the heating element by bridging the contacts. It will be seen that the bi-metallic bar may be adjusted by bending or setting it at its fixed end so that it will operate to move the spring to one side or the other of the pivoting point of the member 25 to break or make the circuit to the heating element between predetermined temperatures, the maximum temperature being such that the iron will not burn any object or material upon which it is being used. The device is automatic in its action and when once installed and adjusted, it will not require further attention. By placing the tension spring so that it passes on either side of the central axis of the bar 25, a quick make and break action is obtained between the contacts so that no arcing or burning of the contacts will ensue. Also, by using a bridge bar to electrically connect the contacts, the necessary air gap between the contacts is quickly attained to prevent arcing. A metallic filling 38 may be provided between the arms 33 and 34 and the groove, with the adjacent surfaces 39 and 40 tapering towards said grooves to hold the member 25 therein.

The device is simple in construction and may be economically manufactured and installed in any heating device to control the temperatures. The device is preferably placed in proximity to the sole or working surface of the iron. The metal strips have very little movement and are preferably working with safety factors well below their elastic limit so that no permanent distortion can occur in the bi-metallic strip through the operation of the device.

Having thus described my invention, what I claim is:—

1. A heat controlling device for an electrically heated unit comprising a tubular member mounted in the unit near the heating surface thereof, a bi-metallic strip secured at one end to the tubular member at one end thereof, a pair of arms extending upwardly from the other end of the member, one of said arms carrying a pair of contacts connected in series with the heater circuit, a bar mounted on a member pivotally mounted on the tube, said bar being adapted to normally bridge the contacts and a resilient connection between the free end of said strip and the pivotally mounted member to make and break the circuit, to automatically keep the unit between a predetermined minimum and maximum temperature, said switch being operated through the movement of the bi-metallic strip due to changes in temperature.

2. A heat controlling device for an electrically heated unit comprising a tubular member mounted in said unit near the heating surface thereof, a bi-metallic strip secured at one end to the tubular member at one end thereof, a pair of arms mounted on the other end of the tubular member, one of said arms being adapted to support a pair of contacts connected in series with the heater, the other arm carrying an adjustable stop, a bridging bar secured to a member pivotally mounted on its edge on the tubular member, and a spring connecting the pivoted member with the free end of the bi-metallic strip to hold the bridging bar normally on the contacts, said bi-metallic strip being adapted to automatically control the pivoting to make and break the circuit between predetermined maximum and minimum temperatures.

In witness whereof, I have hereunto set my hand.

EDWARD ARTHUR STANGER.